M. D. PRICE.
FISHING REEL CLAMP.
APPLICATION FILED OCT. 22, 1920.
1,382,545.
Patented June 21, 1921.
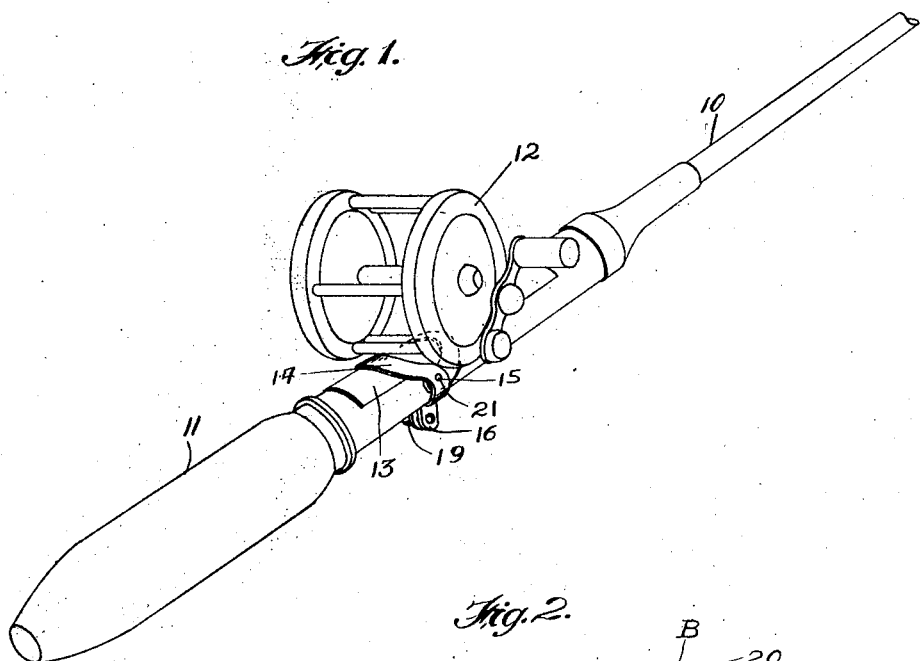
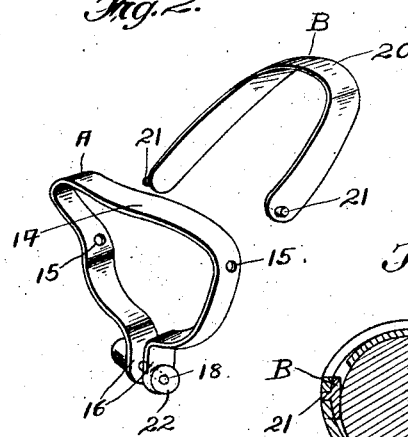
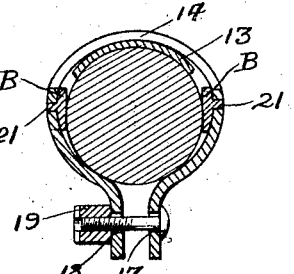
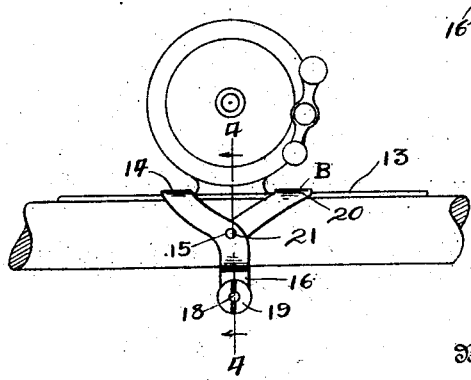
Inventor
Mitchell D. Price
By Knight Bros.
Attorneys

UNITED STATES PATENT OFFICE.

MITCHELL D. PRICE, OF MIAMI, FLORIDA.

FISHING-REEL CLAMP.

1,382,545.  Specification of Letters Patent.  Patented June 21, 1921.

Application filed October 22, 1920. Serial No. 418,829.

*To all whom it may concern:*

Be it known that I, MITCHELL D. PRICE, a citizen of the United States, and resident of Miami, in the county of Dade and State of Florida, have invented certain new and useful Improvements in Fishing-Reel Clamps, of which the following is a specification.

My invention relates to fishing reel clamps and has for one of its objects particularly to provide means for attaching the standard type of fishing reel to a rod.

In fishing tackle now generally used the rod is provided with a seat for the reception of the base of a fishing reel. Various methods are employed for attaching the reel to the rod and it is ofttimes difficult to mount the reel on the fishing rod because the particular holding means was not constructed for the type of reel at hand.

My invention, therefore, contemplates the provision of a clamp which may be universally employed in connection with any type of rod and reel.

More particularly the invention embodies a Y-shaped metal clamp, the two arms of the Y being attached to engage the base of the reel. The clamp is made easily detachable by making one of the Y-shaped arms removable.

The invention will be made more apparent in the accompanying specification and drawings in which:

Figure 1 is a perspective view of a section of the fishing rod showing a reel attached thereto by means of my improved clamp.

Fig. 2 is a perspective view of the clamp with one part thereof disassembled, showing a modified form of fastening means.

Fig. 3 is a side elevation of the clamp as used upon a rod, and

Fig. 4 is a section view on lines 4—4 of Fig. 3.

In the drawings, numeral 10 indicates a rod of usual construction provided with a handle 11. The numeral 12 indicates a standard type of reel provided with the usual base plate 13.

The clamp which forms the subject matter of this invention is composed of two sections A and B. The section A is in the form of a strap which is bent at an intermediate point so as to assume the angular position clearly illustrated in Fig. 3. By so forming the part A an engaging portion 14 is provided which engages the base 13 of the reel. The part A is apertured at points intermediate its length, diametrically opposite one another as indicated at 15. At these points this section of the clamp may be bent laterally to accommodate the ends of section B. The free ends 16 of the part A are bent so as to lie substantially parallel to one another and are suitably apertured as at 17 for the reception of a clamping bolt 18. This clamping bolt is threaded at one end thereof to receive a clamping nut 19.

The part B of the clamp is a substantial U-shaped member and has an engaging portion 20. The free ends of the part B are provided with studs 21 which are adapted to engage the apertures 15 of the part A.

The whole structure as hereinbefore mentioned is made of spring metal and in order to cause the studs 21 to engage the apertures 15 the U-shaped part 21 may be sprung to a contracted position whereby the studs 21 can be positioned opposite the apertures and when pressure upon member B is relieved these studs will enter the apertures 15.

In Fig. 2 a slightly different form of securing means for the free ends of the part A is illustrated. In this form the bolt 18 has its end screw threaded to engage in an enlargement 22 which is correspondingly internally screw threaded for the reception of this bolt. In this form the apertures in the other free end of the part A will be slightly enlarged to permit the stem of the bolt to pass therethrough and the clamping action will occur by reason of a screw threaded engagement of the bolt with the enlargement 22.

In using this improved clamp the reel is placed upon the rod and the part A of the clamp is either slipped over the rod from the end thereof or sprung around the rod so that the engaging portion 14 thereof engages the base 13 of the reel. The part B can then be applied by pressing the ends thereof in and springing the part A apart so that the studs 21 may engage the apertures of 15. When in position, the engaging portion 20 of the part B will also contact with the base 13 of the reel. Thereafter the clamp may be caused to tightly engage the base of the reel and the rod by tightening the clamping bolt 18. The clamping action caused by operating the clamping bolt 18 will be extended to the engaging portions 14 and 20 of the parts A and B respectively. This is so by reason of the engagement of the part B at both of its free ends with the part A of the clamp. The clamping action thus exerted is substantially vertical as viewed in Fig. 3 and will be equally distributed between the two engaging portions. By pivoting the part B it can also adjust itself to any unequalness in the base of the reel. The rod with the reel is then in condition for use and the reel, while securely mounted to the rod may readily be removed in a manner which is obvious.

It is apparent from the foregoing that while I illustrate and describe one particular embodiment of my invention that various modifications in the specific details of the construction may be resorted to without departing from the spirit and scope thereof, and I particularly reserve this right.

Having thus described my invention, what I claim is:

1. A clamp comprising a main member, a second member provided with studs projecting from the free ends thereof for pivotally and removably securing said second member to said main member and means for adjustably securing the free ends of said main member.

2. A clamp of the type described which comprises a main clamping part angularly bent, a second clamping part pivotally secured to the said first part and means for adjustably securing the free ends of the first part, substantially as described.

3. A clamp for a fishing reel which comprises an angularly bent member having its free ends substantially parallel, the angular portion thereof being adapted to overlie the base of a reel, a U-shaped member overlying the base of the reel and having its free ends pivotally secured to the angular member and means for uniting the free ends of said angular member.

4. A clamp of the class described adapted for use with a fishing rod and reel, said clamp comprising a main part, said part having an angular portion adapted to engage the base of the reel, said main part being diametrically apertured intermediate its length, a second U-shaped member engaging the base of a reel, studs projecting from the free ends of said U-shaped member and pivotally engaging said apertures and means for adjustably uniting the free ends of said main part.

5. A clamp for a fishing reel comprising the combination of a main clamping member, a U-shaped second clamping member, means for pivotally securing said second member to said main member and means for adjustably securing the free ends of said main member.

6. A clamp for a fishing reel comprising the combination of an angularly bent main clamping member for overlying one end of the base of a reel, a U-shaped second clamping member pivotally secured to said main member for overlying the other end of the base of said reel and means for adjustably securing the free ends of said main member, substantially as described.

MITCHELL D. PRICE.